(12) United States Patent
Zuccarini

(10) Patent No.: US 6,247,222 B1
(45) Date of Patent: Jun. 19, 2001

(54) PROCESS FOR CASTING A PLASTIC DIE

(75) Inventor: John J. Zuccarini, Metamora, MI (US)

(73) Assignee: Plasco Corporation, Romeo, MI (US)

( * ) Notice: Subject to any disclaimer, the term of this patent is extended or adjusted under 35 U.S.C. 154(b) by 0 days.

(21) Appl. No.: 09/344,998

(22) Filed: Jun. 25, 1999

(51) Int. Cl.⁷ .................................................. B29C 39/26
(52) U.S. Cl. .................. 29/527.1; 249/142; 249/176; 264/219; 264/299
(58) Field of Search .................. 264/219, 299; 249/176, 142; 29/527.1

(56) References Cited

U.S. PATENT DOCUMENTS

| | | | |
|---|---|---|---|
| 1,642,980 | 9/1927 | Turner . | |
| 2,310,830 | 2/1943 | Blair et al. | 18/34 |
| 2,447,620 | 8/1948 | Singleton et al. | 76/107 |
| 2,565,134 | 8/1951 | Kish | 18/55 |
| 2,632,922 | 3/1953 | Kish | 18/59 |
| 2,705,375 | 4/1955 | Foreman et al. | 29/467 |
| 2,715,280 | 8/1955 | Kish | 33/174 |
| 2,750,632 | 6/1956 | Kish | 18/59 |
| 2,776,453 | 1/1957 | Kish | 18/59 |
| 4,427,619 | * 1/1984 | Peterson | 264/337 |
| 4,998,706 | * 3/1991 | Hyll | 249/64 |
| 5,009,826 | 4/1991 | Walker | 264/154 |
| 5,385,700 | * 1/1995 | Denton | 264/317 |
| 5,529,733 | 6/1996 | Lee | 264/273 |
| 5,558,883 | * 9/1996 | Shinada et al. | 264/46.4 |
| 5,608,961 | 3/1997 | Piegeler | 29/452 |
| 5,802,676 | 9/1998 | Zuccarini | 29/468 |

* cited by examiner

Primary Examiner—Allan R. Kuhns
(74) Attorney, Agent, or Firm—Young & Basile, P.C.

(57) ABSTRACT

A method for casting a plastic die including constructing an open ended container having a floor configured to the desired contour shape of the die. A plurality of elongated cores having tapered and arcuate peripheral edges are spaced within the container and secured in place by traversing members. A cavity is formed in the container therebetween for the injection of hardenable material.

5 Claims, 4 Drawing Sheets

PROCESS FOR CASTING A PLASTIC DIE

FIELD OF THE INVENTION

The invention relates to an improved casting process to form a die having a multidirectional surface and in particular for a die for massive items such as aircraft wings. In particular, the invention provides a method of producing plastic dies for tooling suitable for use in forming sheet metal, aluminum or other metals, including a technique such as stretch forming, hydroforming, stamping etc.

BACKGROUND OF THE INVENTION

In the aeronautics industry, for example, the manufacturing of exterior surface portions of the wings and fuselage may included dimensional portions having lengths over 30 feet. As a result, the manufacturing process involves a number of expensive tooling operations. In addition, the massive dimensions needed in the preparation of a master die model for these exterior surface portions can be cumbersome and heavy. It is necessary therefore, that the master die model be easily movable or transportable to the manufacturing facility of the airplanes. It is also necessary to provide a master model die that is cost effective and eliminates some of the expensive tooling operations to produce the die. It is also necessary to produce a model die that is rigid yet relatively lightweight and easily transportable to the manufacturing point.

SUMMARY OF THE INVENTION

The improved process for making a plastic die according to the present invention includes constructing a wood lattice framework having a top surface in the desired contour shape. The lattice framework is built up on the sides of the wooden framework so that the contoured shape top surface forms the floor of the boxed-in model. The lateral rods function to secure wooden cores within the boxed-in model. A plurality of tapered wooden cores having arcuate corners are inserted into the wood model. The wooden cores may have different shapes and lengths to accommodate the various stress levels of the manufactured portion. Lateral rods are fed through apertures in the upper walls wooden cores to hold the wooden cores at predetermined levels above the contour floor. The cavity within the boxed-in model surrounding the wooden cores is filled with a resin material or other appropriate hardenable material. The exterior of the wood cores may be previously coated before insertion into the boxed-in model with a wax-type material so that the cores do not adhere to the resin and may be easily removed from the boxed-in model once the resin has solidified. A honeycombed surface is then provided by the removal of the cores after the resin has solidified, and the honeycomb surface forms a bottom surface for the die. The sides and the lattice framework can then be removed from the die so that the desired contour surface is exposed. The contour surface is finally machined to finish the contour to the precise die form.

It is the intent of this invention to provide an improved method of casting a plastic die for large structures such as those required in the aeronautics industry.

It is another object of this invention to provide a cost effective method of casting a plastic die for such structures.

It is further an object of this invention to provide a method of casting a plastic die that provides a relatively lightweight, yet strong die.

It is also an object of this invention to further improve the process and the resultant die as disclosed in U.S. Pat. No. 5,802,696 issued to the applicant by strengthening the overall finished die.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
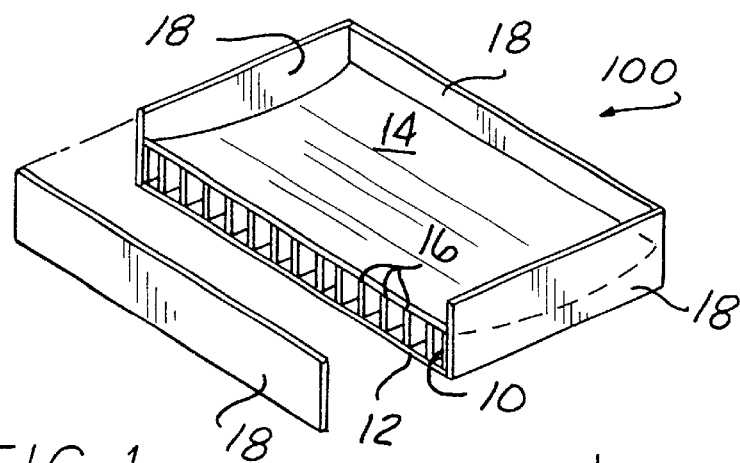
FIG. 1 is a perspective view of the first stage of the die producing structure embodying the invention.

The FIGS. 1–9 illustrate the steps for producing and casting a plastic die using a die producing structure 100 that is easily assembled and that provides a lightweight mold or die that is easily transportable. As seen in FIG. 1, a lattice framework 10 is initially constructed. The lattice structure 10 forms a base of the die producing structure 100 and has a bottom planar surface 12 and a top surface 14. The top surface 14 is formed to essentially duplicate the contour surface of the desired shape for the final die. A series of vertical extensions 16 extend from the bottom surface 12 to the top surface 14. The vertical extensions 16 have varying lengths to conform with the contoured top surface 14. The lattice framework 10 is then enclosed or boxed in at all four sides with upwardly extending walls 18 such that the sides of the lattice framework 10 are entirely enclosed and the contoured top surface 14 now defines the floor of the die producing structure 100. The die producing structure 100 has an open ended upper portion 20.

Figure 2:
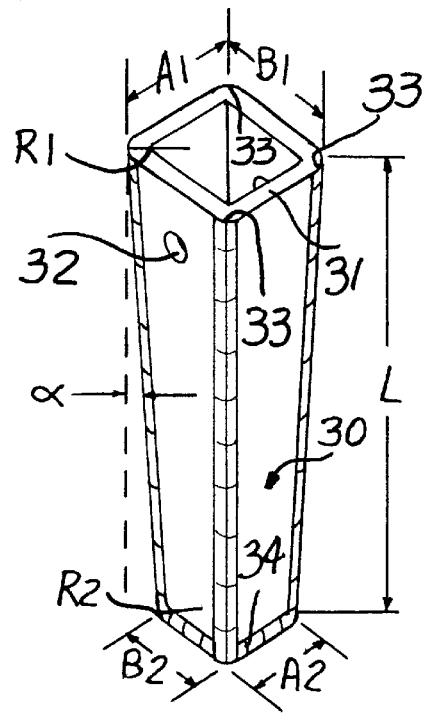
FIG. 2 is a perspective view showing a typical core used according to the present invention.

A plurality of hollow wooden cores 30 are used for placement within the die producing structure 100 to define a honeycomb for injection of the hardenable material 38. As shown in FIG. 2, each wooden core 30 is shaped into an elongated and tapered hollow box for placement within the die producing structure 100 in a vertical position. The wooden cores 30 are tapered such that the smaller tapered end 34 is inserted into the die producing structure 100. The taper of the vertical walls 31 of the core 30 should be at least a 2° angle (α). A taper of 2° can result, for example, in a core having a length (L) of 6.0 foot and dimensions of 11.0 inches for each side wall A1 and B1 at open end 31 to have dimensions of 9.0 inches for each side wall A2 and B2 at the bottom closed end 34. If a side wall A1 or B1 is 8.0 inches the side wall A2 or B2 will be 6.0 inches at end 34 of core 30. Each core 30 is further shaped to eliminate angular corners along the peripheral edges. Instead, any angular corner 33 is modified to include an arcuate surface having at least a 1.0 inch radius, (R1 and R2). The arcuate surface R2 of a corner at the tapered end 34 of the core may have a different radius than the arcuate surface R1 of the top end of the core. The tapered walls and the arcuate corners of the outer peripheral edges help to eliminate a vacuum being created under the cores 30 when the cores 30 are being removed from the die producing structure 100. In the prior art, the cores included elongated, rectangular hollow boxes. When a row of wooden cores were removed from the die in the prior art, the non-tapered vertical walls caused a vacuum between the bottom surface of the wooden core and the core surface which made the disengagement of the wood core 30 from the die producing structure 100 difficult. By changing the shape of the cores as described supra, the cores can be easily removed from the die producing structure 100. More importantly, the tapered and rounded cores result in more resin located at the top surface 14 of the die producing structure to provide an overall stronger and more durable die.

Figure 3:
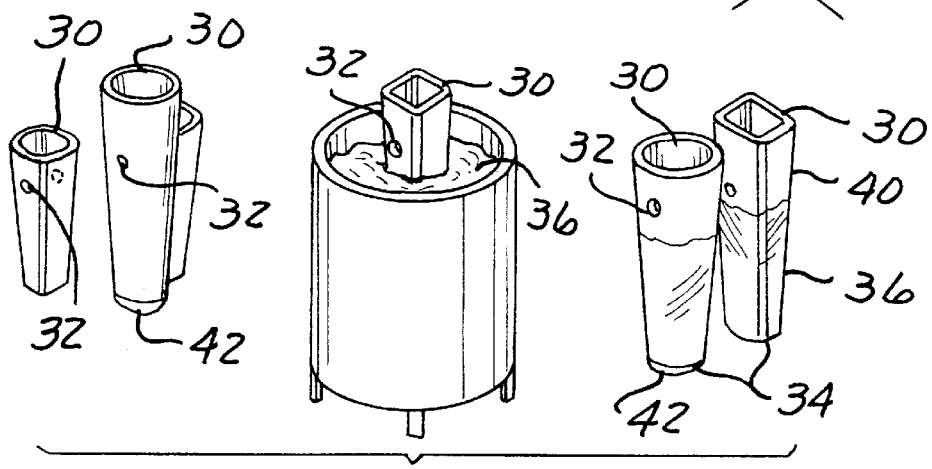
FIG. 3 is a view of sectional cores during the coating process.
Figure 4:
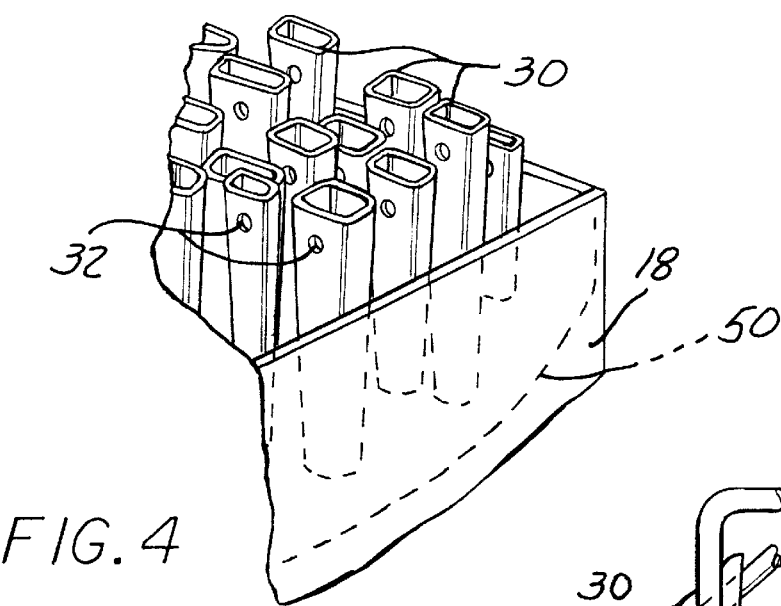
FIG. 4 is a partial view of the placement of the sectional cores within the die producing structure.

As shown in FIGS. 3 and 4, each core 30 has through apertures 32 on opposing sides of the core 30 so that traverse rods 28 may be received through apertures 32 to extend through core 30. Therefore, when the cores 30 are positioned within the die producing structure 100 a row of cores 30 may be arranged so that the apertures 32 are in linear alignment. The through apertures 32 are spaced at a predetermined height position above the bottom closed end 34 of the core 30. Feeding the traverse rods 28 through the wooden cores 30 maintain the cores 30 in a stationary position. The bottom 34 of each core 30 is also maintained at predetermined heights above the contour floor 14 of the die producing structure 100. The heights maintained above the contour floor 14 may vary depending upon the stress level that will be experienced upon a certain section of the die.

As shown in FIG. 3, each core 30 before being inserted into the die producing structure 100 is preferably partially coated with a microcrystalline material 36, such as wax, to prevent the hardenable material 38 that is later injected into the die producing structure 100 from adhering to the exterior surfaces 40 of the cores 30. As shown, the core 30 is not entirely coated with the micro crystalline material 36. The core 30 is coated only below the through apertures 32.

In addition, a selected number of the cores 30 may also include a preformed lower extension 42 added to the bottom 34 of the core 30 and shaped to conform to the variance of the contour floor 14 at a prescribed location of the core 30 within the die producing structure 100. The lower extensions 42 on the selected cores are preferable made of a heat resistant material so that the hardenable material 38 does not penetrate the extensions 42 when injected into structure 100. The lower extensions 42 added to the bottom 34 of a selected number of cores 30 allow the space between the bottom of the core 30 and the contour floor 14 of the die producing structure 100 to maintain the predetermined distance. The distance between the floor 14 and the cores 30 are determined by manufacturing requirements and can vary preferably from approximately four to six inches.

As shown in FIG. 4 the wooden cores 30 are placed within the die producing structure 100 such that the through apertures 32 on the cores 30 are positioned in alignment so that the traverse rods 28 may be received therethrough. The traverse rods 28 extend beyond the opposing upwardly extending walls 18, therefore a row of wooden cores 30 are held at predetermined distances from the contour floor of the die producing structure 100 and held in position by the traversed rods 28. The wooden cores 30 although preferably aligned so that the through apertures 34 therein form a line for receiving the traverse rods, the cores 30 need not be evenly spaced between each other, but should be spaced according to the stress levels that the resultant die wall will experience. For example, if a portion of a die for an aircraft wing is subject to high stress levels during the manufacture of the wing, less cores would be placed in that region so that more of the resin or other appropriate hardenable material will occupy that space. Further, the cores may be produced to have different shapes and lengths of vertical side walls to better accommodate the varying shapes of the die producing structure.

Figure 5:
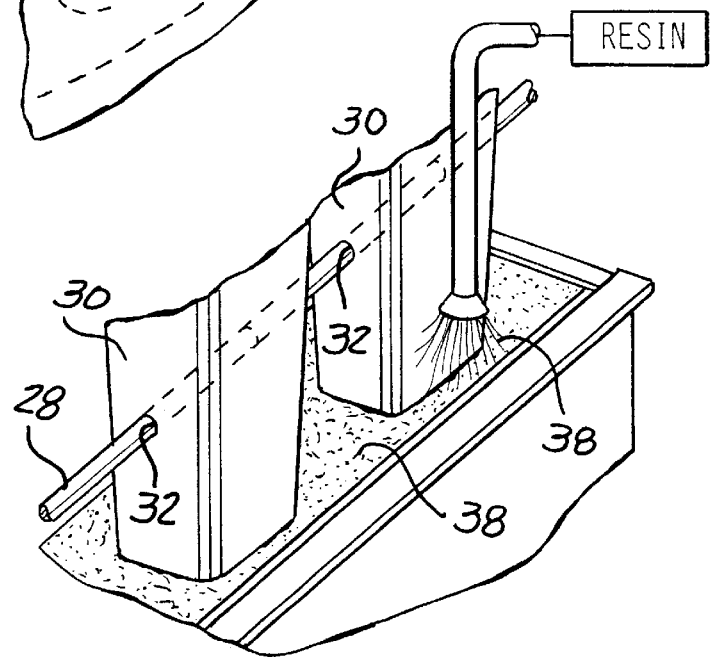
FIG. 5 is a schematic view of plastic material being ejected into the die producing structure between the sectional core.
Figure 6:
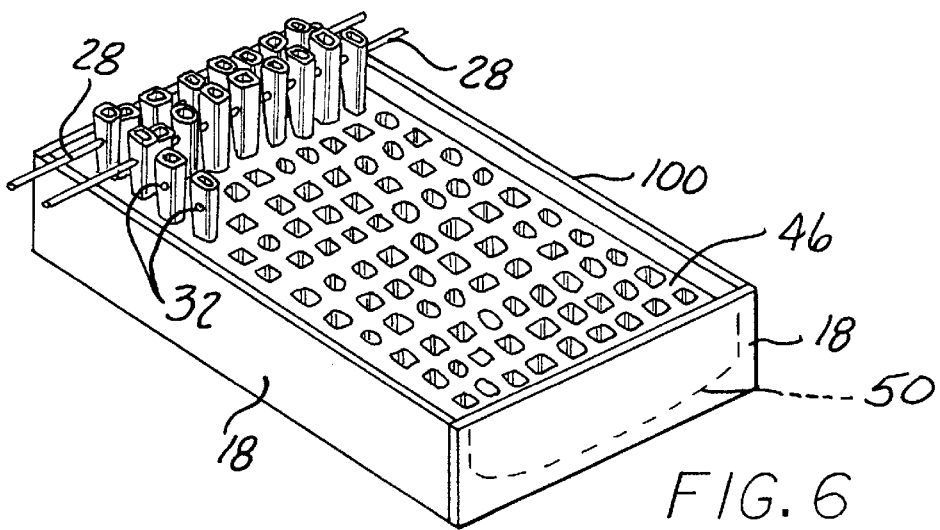
FIG. 6 is a perspective view of the solidified plastic die having a honeycomb surface within the die producing structure.

Once the die producing structure 100 is filled with the spaced wooden cores, a supply of resin, such as plastic, or other appropriate hardenable material 38 is injected into the cavity 44 of the die producing structure 100 formed around the cores 30, as shown in FIG. 5. The hardenable material 38 is allowed to solidify by conventional methods. Once the resin or hardenable material 38 has solidified, the traverse rods 28 are pulled from the wooden cores 30. The wooden cores 30 can then be easily removed from the die producing structure 100 along with the longitudinal members 22. The upwardly extending walls 18 of the die producing structure 100 are also removed so that the casted die 46 may be removed from the lattice framework 10. The resultant die 46 provides a honeycomb back surface 48 and a contour front surface 50 that coincides with the desired contour of the die. The contour front surface 50 will have a thickness according to the stress levels that will be experienced at that portion of the die as a result of the spacing of the cores 30 from the floor 14 in the die producing structure 100. This thickness will provide stability to the resultant die 46.

Figure 7:
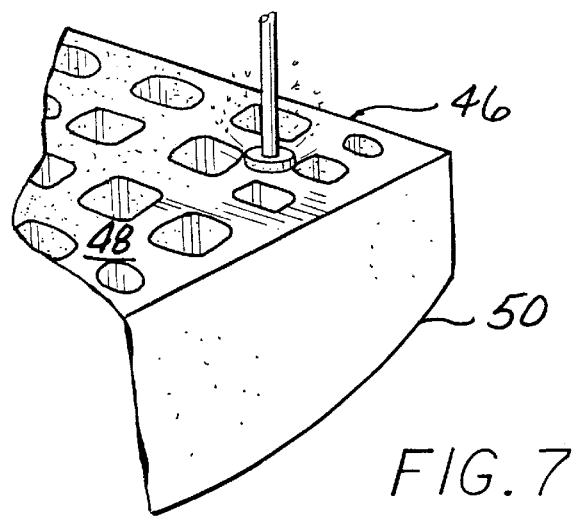
FIG. 7 is a partial view of the solidified plastic die during the machining process of the honeycomb surface.
Figure 8:
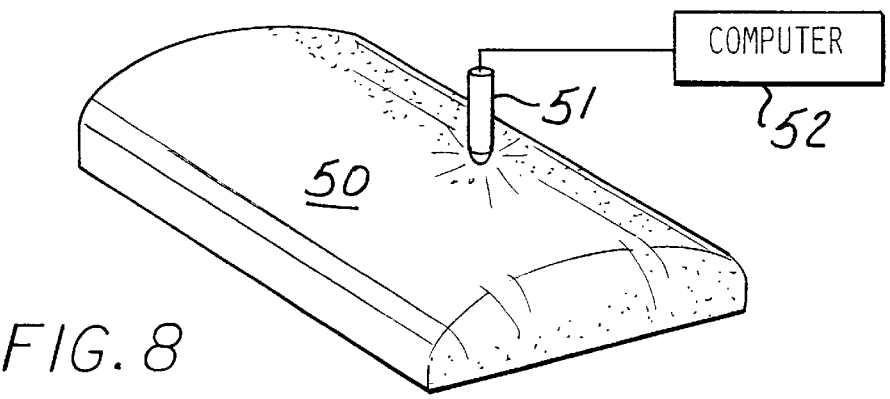
FIG. 8 is a perspective view of the machining process of the contour surface of the plastic casting die.
Figure 9:
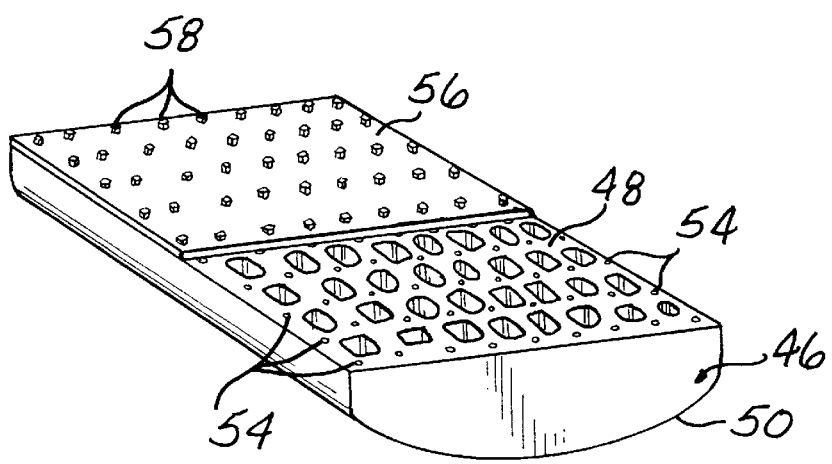
FIG. 9 is a perspective view of the plastic casted die having drilled holes at intersections of the honeycomb surface.

The honeycomb surface 48 is then machined to remove jagged edges and burrs as shown in FIG. 7. The contour front surface 50 is also machined by a five axis NC milling machine 51 that is computer 52 controlled to the precise measurements and contour of the die required. After the final die 46 is machined, apertures 54 are drilled at the cross sections of the honeycomb surface 48 of the die mold 46. A solid base structure 56 may then be secured onto the honeycomb surface 48 via screws or bolts 58 drilled into the aperture 54 at the cross sections. Only a portion of a solid base structure 56 needs to be attached to the honeycomb surface in order to provide a sliding surface 56 for the base that does not damage the honeycomb surface 48.

Figure 10:
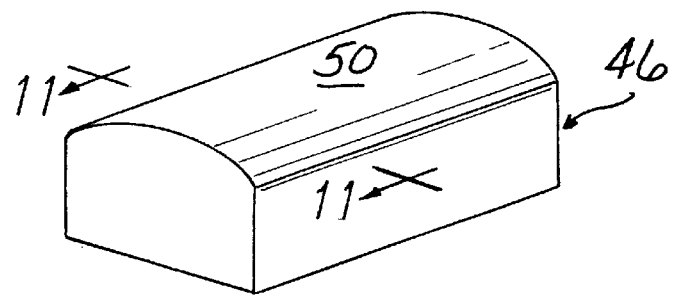
FIG. 10 is a perspective view of a finished die constructed according the present invention.
Figure 11:
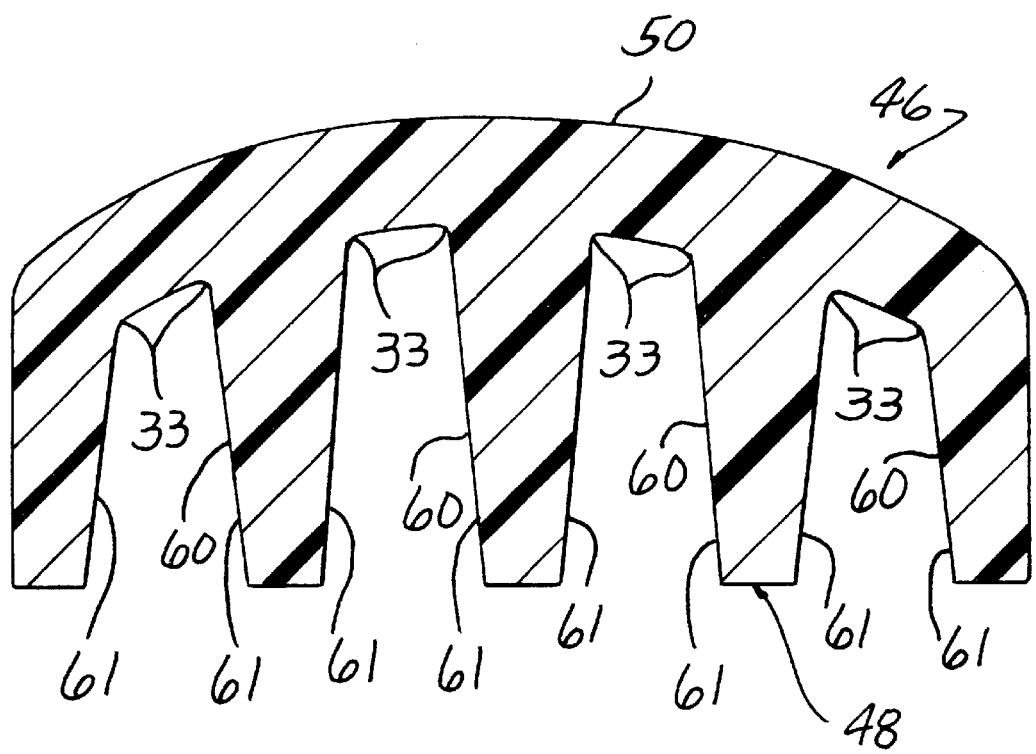
FIG. 11 is a sectional view of the finished die taken along lines 11—11 in FIG. 10.

FIG. 10 shows a typical finished die 46 with the contour front surface 50 exposed for use. FIG. 11 shows a sectional view of FIG. 10 to show typical shapes of honeycomb configuration formed as a result of the cores 30. The honeycomb walls 61 are tapered as the walls 61 approach contour surface 50. The outer peripheral edges and corners 33 have an arcuate surface of at least a 1.0 inch radius. It is apparent from FIG. 11 that the cores 30 can be different shapes to provide honeycomb interiors 60 in the die 46 to accommodate the curvature of the contour front surface 50 as well as the stress levels of the die 46 at certain areas. It also can be seen that the number of cores 30 to manufacture a die will vary depending on the size of the fixed die.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. It is understood that manufacturing requirements may include modification to the contour front surface 50 after machining. An example of such a requirement would be apertures for dowel or bolt locations in the contour surface 50.

What is claimed is:

1. An improved method of casting a rigid plastic die having a contour surface where a framework having a bottom planar surface and a top surface spaced from the bottom surface is constructed having a shape essentially duplicating the contour surface of the die and then the periphery of the framework is enclosed with upwardly extending walls such that the periphery of the framework is entirely closed so the walls extend above the top surface forming a container with an open ended upper portion and then inserting and securing cores within the container and then pouring hardenable plastic material into the cavity of the container and allowing the plastic material to solidify to a rigid structure forming the casted die, the improvement comprising:

using a plurality of cores having tapered side walls for insertion into the container; and using a plurality of cores having arcuate corners where two adjacent side walls meet for insertion into the container.

2. The improved method of claim 1 further comprising the step of using a plurality of cores having at least a 2° angle tapered sidewall.

3. The improved method of claim 1 further comprising the step of using a plurality of cores having all peripheral arcuate edges with a radius of at least 1.0 inch.

4. The improved method of claim 1 further comprising the steps of using a plurality of cores having varying shapes for insertion into the container and positioning the varying shaped cores to accommodate the stress levels of the die.

5. The improved method of claim 4 further comprising the step of inserting the plurality of cores a predetermined distance from the top surface of the framework.

* * * * *